Oct. 24, 1933. E. D. BOISSELIER Re. 18,981

LIGHTING SYSTEM FOR TOY LOCOMOTIVES

Original Filed July 21, 1932 2 Sheets-Sheet 1

Inventor
E. D. Boisselier,
D. T. Walhauser
Attorney

Oct. 24, 1933. E. D. BOISSELIER Re. 18,981

LIGHTING SYSTEM FOR TOY LOCOMOTIVES

Original Filed July 21, 1932 2 Sheets-Sheet 2

Inventor

E. D. Boisselier,

By D. P. Wallace Ster

Attorney

Reissued Oct. 24, 1933

Re. 18,981

UNITED STATES PATENT OFFICE 18,981

LIGHTING SYSTEM FOR TOY LOCOMOTIVES

Earl D. Boisselier, Chicago, Ill., assignor to American Flyer Mfg. Co., Chicago, Ill., a corporation of Illinois Original No. 1,914,323, dated June 13, 1933, Serial No. 623,901, July 21, 1932. Application for reissue July 1, 1933. Serial No. 678,700

6 Claims. (Cl. 46—48)

This invention relates to toy locomotives or cars and more particularly to a novel improvement for lighting a locomotive using a spring motor for propulsion means.

Heretofore, locomotives using a spring motor or propulsion means other than an electric motor could not use a headlight because no means has been contemplated for providing power to illuminate the headlight.

Accordingly, a primary object of the invention is to provide a headlight in a locomotive and means for illuminating the headlight at the will of the operator. To provide this illuminating means it is proposed to place a small battery of the dry cell type within the cab of the locomotive, or the body of the tender or a car in the train. The operator can, at will, shut off or turn on the current from this battery to provide illuminating means to the headlight by means of a wire connecting the headlight and battery, said wire to be provided with a switching arrangement, or other means, for disconnecting it from said battery.

In connection with the foregoing, an important feature of the invention resides in providing a novel unit for mounting the battery whereby the same can be mounted on a car or locomotive or on a fender of a toy auto or truck, or on the seat of a toy auto or truck, or to any part of the chassis or body of a toy auto or truck, according to the demands of manufacturing process thereby to provide a source of electrical energy for lights or lamps. Completed battery holder units may be easily stocked and with slight extra labor incorporated in the particular toy, thus allowing an easy liquidation of stock already on hand by adding the feature of electric headlights.

A further object of the invention is to construct a simple, practical and reliable lighting system particularly adapted to toy use because of its ruggedness and simplicity which not only renders it economical to manufacture, but better able to withstand the rough usage to which cars and locomotives of this character are usually subjected.

With the above and other objects in view, which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which:—

Figure 7 is a detail vertical sectional view of the lamp socket construction for the headlight.

Similar reference characters designate corresponding parts throughout the several figures of the drawings.

Figure 1:
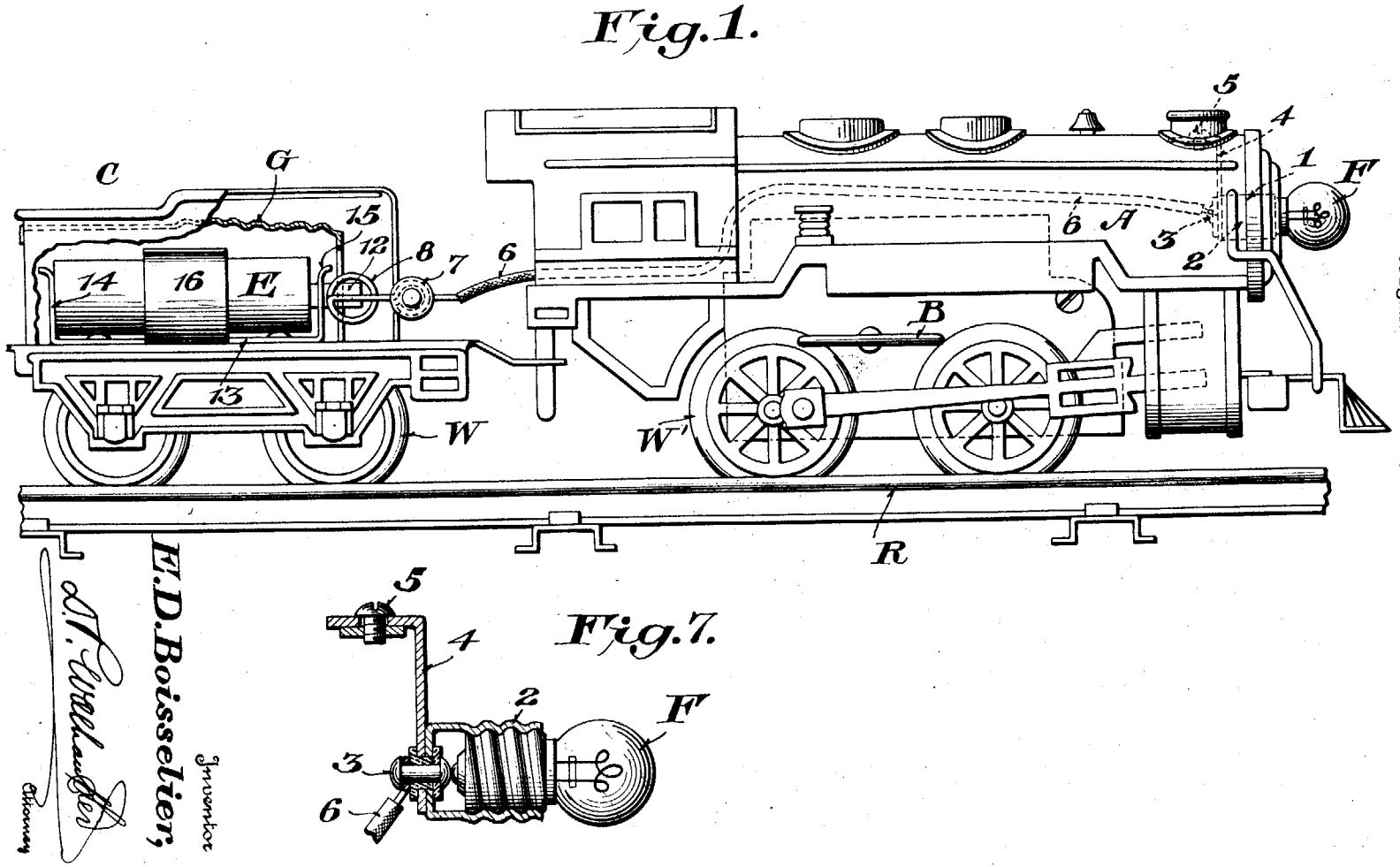
Figure 1 is a side elevation of a locomotive and tender illustrating the application of the invention.

As will be apparent from the drawings and the objects of the invention above stated, a distinctive feature of the present invention is to provide a toy train using a spring motor or other non-electrical propulsion means with an electrical lighting system that will compare favorably with the lighting system at present in use on toy trains using electrical means for propulsion and supplied with a constant flow of electrical energy from a transformer or other means connected with an electrical circuit. An electrical lighting system on a non-electric train has very desirable features inasmuch as it adds the desirable feature of animation incident to electrical trains to a non-electric outfit, thus providing users of trains in rural districts where electrical energy is not available, with the opportunity of observing and enjoying the effects of electric headlights on mechanical trains simply by using a two rail system instead of a three rail system. Thus, it will be apparent that the present invention not only provides a very desirable feature for trains without electrical propulsion, but also brings very desirable educational features to users otherwise not having access to proper sources of commercial current or the necessary equipment to operate an electrical train.

Referring to the drawings, A designates a toy locomotive having a spring motor which is wound by the key B. The locomotive has coupled therewith in the conventional manner a trailer or tender C which serves, in the present instance, as a carrier for the novel battery holding device D which receives the battery E that furnishes electrical energy to the headlight or lamp F on the locomotive.

Figure 4:
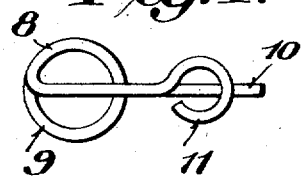
Figure 4 is an end elevation of the wire terminal clip.
Figure 5:
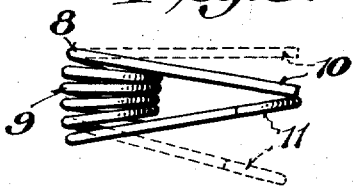
Figure 5 is a plan view of the terminal clip shown in Figure 4 having its ends moved together in full lines to illustrate the manner in which it may be applied to the battery terminal.

Referring first to the features of the invention in connection with the locomotive it will be observed that the front end of the locomotive is provided with an opening 1 for receiving a lamp socket 2 which includes the usual metallic shell for receiving the plug of the lamp and an insulated center plug contact 3 all of which is carried by the bracket 4 suitably mounted in the body of the locomotive by the fastening 5. The shell of the lamp socket is grounded to the metallic bracket 4 and, therefore, provides the ground circuit of the lamp. The insulated center plug contact 3 has secured thereto the wire 6 which leads back through the hollow body of the locomotive and is eyeleted or otherwise connected to the eye 7 of a connector clip 8. This connector clip preferably consists of a coiled body portion 9 having the ends or arms 10 and 11, the latter being provided with the eye which receives the ends of the wire 6. As will be apparent from Figures 4 and 5, particularly the latter figure, by squeezing the arms 10 and 11 together as shown in full lines in Figure 5, the convolutions of the coiled body 9 may be separated to facilitate the placing of the connection over the battery terminal 12 (Figure 1). Thus, in this way, the center plug of the lamp may be connected with the positive terminal of the battery E.

Figure 2:
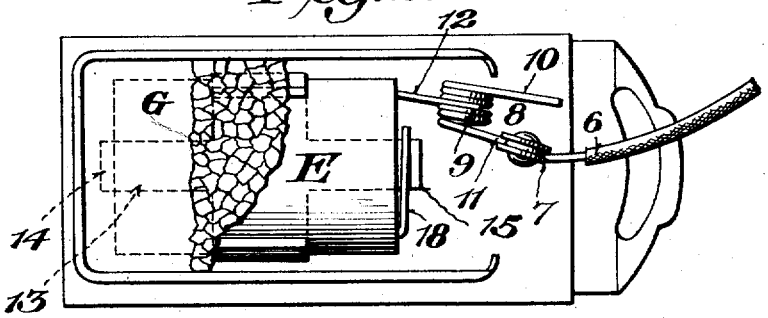
Figure 2 is a top plan view of the tender with a part of the casing simulating coal being broken away to show the battery holder, etc.
Figure 3:
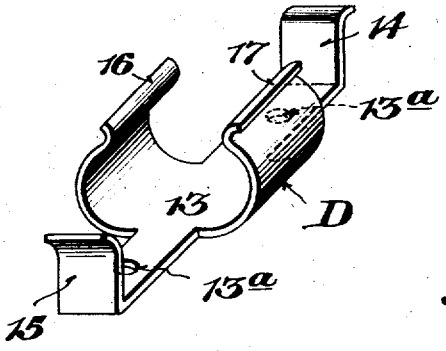
Figure 3 is a perspective view of the battery holding unit.
Figure 6:
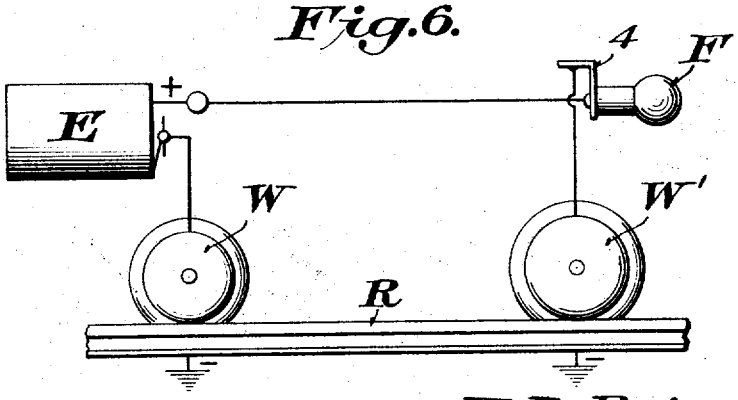
Figure 6 is a diagrammatic view illustrating the circuit involved.

Referring further to the battery holder D for receiving the battery E, it will be observed from Figure 3 that the holder comprises a body strip 13 having the upturned ends 14 and 15 and also formed with the upwardly extending spring side flanges or clip portions 16 and 17. The body strip 13 may be provided with openings 13ª to receive fasteners for securing the holder to the body of the toy. Upon placing the battery E in the holder between the end members 14 and 15 and the side members 16 and 17, it will be apparent from Figures 1 and 2 that the negative terminal 18 of the battery E will be placed in contact with the upturned end 15 of the battery holder. Thus, the battery holder being metallic and connected to the metal toy the negative terminal 18 of the battery will be included in the ground circuit for the lamp. In that connection reference may be made to Figure 6 which illustrates a diagram of the circuits involved and from which it will be observed that the ground circuit is definitely completed through the wheels W of the tender, the rails R and the wheels W′ of the locomotive, all parts of the locomotive and tender being of metal so that completion of the circuit is assured.

The arrangement described permits of disconnecting the engine and tender by disconnecting the terminal clip 8 from the battery E, and also when the locomotive and tender are coupled permits the user of the train to utilize the connector as a switch for turning on and off the headlight of the locomotive by connecting and disconnecting the clip. In the illustration shown the battery holder D and the battery E may be concealed by the cover G (Figure 1) which is intended to simulate coal in the tender. Replacement of the battery is provided for by removing the cover G and removing the old battery and inserting a new one in the holder. In each instance, of course, it will be understood that one terminal of the battery is grounded to the holder which is in turn grounded to the body of the toy and the metal rails, the rails being relied upon as the primary conductor for the ground circuit due to the fact that the coupling between the tender and the locomotive is loose and under some conditions of use good contact might not be made between the coupling parts.

As previously indicated, the invention is applicable to other toys in the respect that the battery holder may be conveniently positioned on the toy and the battery placed therein while the headlight and its connector, being readily connected and disconnected with the battery, may serve to illuminate the headlight or not, according to the desire of the user.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a toy mechanical railway, the combination with a toy locomotive inclusive of a boiler simulating body, and a tender flexibly and detachably coupled thereto, an electrical lamp carried by the front end of the locomotive body as a headlight therefor, a battery holder fitted within the tender, a battery cell mounted in said battery holder and having a projecting terminal and a single flexible insulated conductor wire connected at one end to one terminal of the lamp and carrying at its other end a frictional connector adapted to have a slip engagement with said projecting battery terminal.

2. A mechanically operated toy railway including a toy locomotive having a boiler simulating body, a tender adapted to be coupled to said boiler simulating body, metallic means on which the locomotive and tender are adapted to travel, an electric lamp mounted at the front end of the locomotive body and constituting a headlight therefor, said lamp having one of its terminals grounded to the locomotive body, a metallic battery holder carried by the tender and grounded through the tender body, said battery holder being adapted to receive a battery cell and being in contact with one of the terminals thereof, a single conductor wire connected at one end with the other lamp terminal and a friction clip carried by the opposite end of the wire and adapted to detachably engage the other battery terminal.

3. A wheeled toy including a pair of coupled metal vehicles, an electrical lamp carried by the front end of one vehicle as a headlight therefor, a battery cell mounted in the other vehicle and having one terminal in conductive relation to the bodies of both vehicles and to one terminal of the lamp, and conductor means electrically connecting the other terminal of the lamp with the other terminal of the battery.

4. A wheeled toy, adapted to travel on a metal track, including a pair of coupled metal vehicles, an electrical lamp carried by one vehicle as a headlight therefor, a battery cell mounted in the other vehicle, and having one terminal in conductive relation to the metal body thereof, and a single flexible insulated conductor wire connected at one end to one terminal of the lamp and having its other end detachably connected with the other battery terminal.

5. A wheeled toy including a pair of coupled metal vehicles, an electrical lamp carried by one of the vehicles, a battery cell mounted in the other vehicle and having one terminal in conductive relation to the bodies of both vehicles and to one terminal of the lamp, and conductor means electrically connecting the other terminal of the lamp with the other terminal of the battery.

6. A wheeled top including a plurality of conductively coupled metal vehicles, battery dry-cell holding means in one of the vehicles and in conductive relation thereto, a battery dry-cell held in operative position by said battery holding means and having one terminal in conductive relation thereto, an electrical lamp carried by another of the vehicles and having one terminal in conductive relation thereto, and means for electrically connecting the other terminal of the lamp with the other terminal of the battery.

EARL D. BOISSELIER.